JAMES H. GILLIS.

Improvement in Rigging Clamps.

No. 120,962.    Patented Nov. 14, 1871.

Witnesses,
Chas. H. Smith
Geo. D. Walker

James H. Gillis
Lemuel W. Serrell
Atty.

UNITED STATES PATENT OFFICE.

JAMES H. GILLIS, OF WASHINGTON, DISTRICT OF COLUMBIA, ASSIGNOR TO JOSEPH J. WALTON, OF NEWARK, NEW JERSEY.

IMPROVEMENT IN RIGGING-CLAMPS.

Specification forming part of Letters Patent No. 120,962, dated November 14, 1871.

*To all whom it may concern:*

Be it known that I, JAMES H. GILLIS, of Washington, in the District of Columbia, have invented an Improvement in Clamps for Ropes; and the following is declared to be a correct description of the same.

This invention relates to a pair of clamps to be placed around a rope and connect said rope to the place to which the clamp is united, or to connect with said rope a second rope or chain. This clamp is primarily intended for attaching a rope trace in harness either to the whiffletree or to the collar, so that in case of such rope breaking another piece can be substituted on the spot without having to remove the harness; or the trace may be lengthened or shortened, as required, by moving the rope through the clamp; but this clamp is adapted to connecting a rope to a chain in the rigging of vessels or in hoisting apparatus; or the clamp may be used to connect a branch rope or chain to a main rope, or for holding the ropes of standing rigging so as to allow of the same being drawn through the clamp in tightening up such rigging.

A clamp has been made for rope-traces, but it was objectionable because the rope had to be threaded through the clamp. In my clamp the parts can be separated and applied at opposite sides to any part of the rope.

Figure 1:
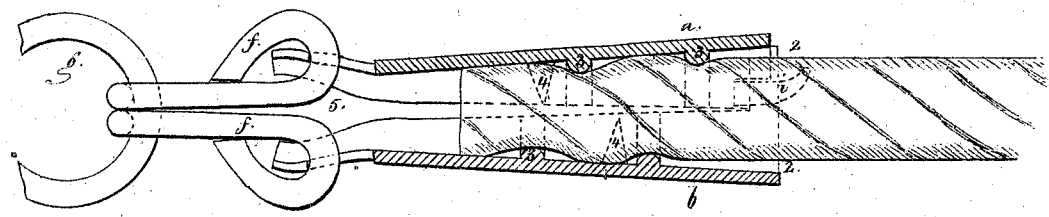
Figure 2:
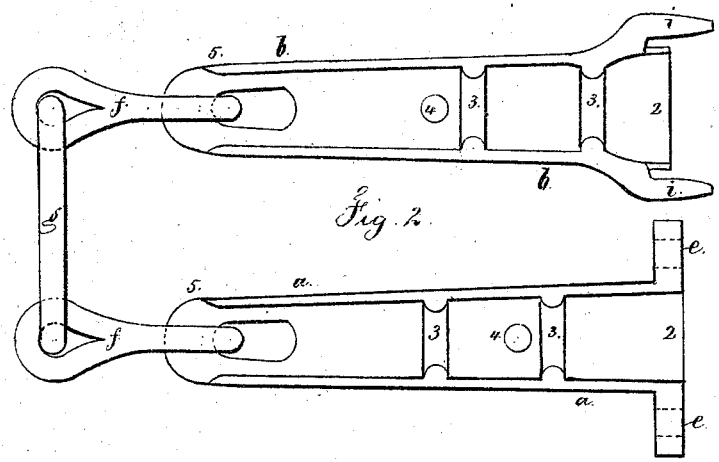
Figure 3:
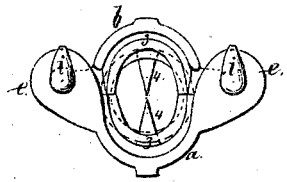

In the drawing, Figure 1 is a longitudinal section of my clamp as applied upon a rope. Fig. 2 is a view of the interior surface of the clamps; and Fig. 3 is an end view of the clamps without the rope.

The clamps $a$ and $b$ are made of wrought or malleable cast-iron or other metal, according to the use to which they are to be applied. These clamps are of a half-cylindrical shape, but sufficiently flaring at 2 to prevent the rope being cut by the ends of the clamps. Within these clamps are the ribs 3 3 and penetrating points 4 4, that act to prevent the rope slipping in the clamp when the said clamp is forcibly compressed upon the same. The clamp $a$ has projecting eyes $e\ e$, and the clamp $b$ has the projecting horns $i\ i$, and when the horns are passed through the eyes the clamps will thereby be connected around the rope; and to firmly compress the rope the moving ends 5 5 of such clamps are brought together with the force due to the leverage. At the ends 5 5 are the links $f\ f$, extending to the ring $g$. These links allow the clamps to be opened, and when strain is applied to the ring $g$ the clamps are made to gripe the rope with increased force as the power is increased. To the ring $g$ a chain or rope may be attached, or said ring may be attached to the whiffletree or collar, and the parts can be employed in any other manner wherever available.

I claim as my invention—

1. The two-part clamp $a\ b$ locked together by means of the eyes $e$ and horns $i\ i$, substantially as and for the purposes set forth.

2. The links $f\ f$ connecting the two-part clamps $a\ b$ to the ring $g$, in combination with the horns $i\ i$ and eyes $e\ e$ for connecting the clamps $a\ b$ to each other, substantially as and for the purposes set forth.

In witness whereof I have hereunto set my signature this 16th day of August, A. D. 1871.

JAMES H. GILLIS.

Witnesses:
   WM. H. MINNIX,
   SAML. BELDEN. (138)